US012728438B2

(12) United States Patent
Yang et al.

(10) Patent No.: US 12,728,438 B2
(45) Date of Patent: Sep. 8, 2026

(54) AUTOMATIC GLUING APPARATUS FOR FIXED SHAFT-TYPE REWINDING REEL

(71) Applicants: Shenzhen Yinghe Technology Co., Ltd., Guangdong (CN); Huizhou Yinghe Technology Co., Ltd, Guangdong (CN)

(72) Inventors: Xin Yang, Guangdong (CN); Shuhong Huang, Guangdong (CN); Quanhong Zhang, Guangdong (CN); Pengyun Yang, Guangdong (CN); Shunshun Cai, Guangdong (CN); Shi Wang, Guangdong (CN); Zizhuan Zhang, Guangdong (CN); Xianjin Yi, Guangdong (CN)

(73) Assignees: Shenzhen Yinghe Technology Co., Ltd., Guangdong (CN); Huizhou Yinghe Technology Co., Ltd, Guangdong (CN)

( * ) Notice: Subject to any disclaimer, the term of this patent is extended or adjusted under 35 U.S.C. 154(b) by 89 days.

(21) Appl. No.: 18/922,446

(22) Filed: Oct. 22, 2024

(65) Prior Publication Data

US 2025/0205728 A1 Jun. 26, 2025

(30) Foreign Application Priority Data

Dec. 20, 2023 (CN) ........................ 202311769636.8

(51) Int. Cl.
*B05C 1/08* (2006.01)
*B05C 11/04* (2006.01)

(52) U.S. Cl.
CPC .......... *B05C 1/0813* (2013.01); *B05C 11/041* (2013.01)

(58) Field of Classification Search
CPC ....... B05C 1/0813; B05C 11/041; B05C 9/14; B05C 5/02; B05B 15/50; B05D 3/0413; B65H 19/28; B65H 19/283; B65H 19/286; B65H 75/28; B65H 2301/41427; B65H 2301/5113; B65H 2301/51132
See application file for complete search history.

(56) References Cited

U.S. PATENT DOCUMENTS 4,991,507 A * 2/1991 Nozaka ................. B41F 35/006 101/423
5,653,401 A * 8/1997 Biagiotti .............. B65H 19/283 156/578
2010/0189916 A1* 7/2010 Watanabe ............... B05C 5/002 118/107

* cited by examiner

*Primary Examiner* — George R Koch
(74) *Attorney, Agent, or Firm* — Birchwood IP

(57) ABSTRACT

The present invention discloses an automatic gluing apparatus for a fixed shaft-type rewinding reel, including a gluing mechanism and a glue supply mechanism, where the gluing mechanism includes a mounting plate, a side of the mounting plate is provided with a glue scraping head configured to apply a glue to the rewinding reel, a glue-scraping drive assembly that is configured to drive the glue scraping head to approach or leave the rewinding reel is disposed between the glue scraping head and the mounting plate, and the glue scraping head includes a glue scraping surface fitting with a shape of an outer surface of the rewinding reel; the glue supply mechanism disposed on a side of the mounting plate, connected to the glue scraping head. The gluing mechanism can resolve the inconvenience of the manual gluing operation, improve the efficiency of electrode plate rewinding.

9 Claims, 8 Drawing Sheets

AUTOMATIC GLUING APPARATUS FOR FIXED SHAFT-TYPE REWINDING REEL

TECHNICAL FIELD

The present invention relates to the field of lithium-battery producing devices, and in particular to, an automatic gluing apparatus for a fixed shaft-type rewinding reel.

BACKGROUND OF THE INVENTION

The electrode plate is one of the key components in lithium batteries. Currently, the production process of the electrode plate includes coating, rolling, and slitting of the electrode plate. The electrode plate is mainly cut by a slitting machine to form material strips of a specific width. For convenience in use and transportation, the slit electrode plates typically need to be wound into rolls on a rewinding reel.

Before rewound, the electrode plate requires manual gluing operation on the surface of the reel. Specifically, a worker sticks a double-sided tape or yellow glue onto the surface of the empty reel, and the electrode plate is fixed to the reel via the double-sided tape or yellow glue, and then wound. However, the manual gluing operation has low efficiency, which affects the production efficiency of the electrode plates.

BRIEF SUMMARY OF THE INVENTION

An objective of the present invention is to provide an automatic gluing apparatus for a fixed shaft-type rewinding reel. After a glue supply mechanism supplies a glue to a gluing mechanism, the gluing mechanism automatically applies the glue to the surface of the rewinding reel. This gluing mechanism can resolve the inconvenience of the manual gluing operation, improve the efficiency of electrode plate rewinding, and address the problem that the low efficiency of the manual gluing operation affects the production efficiency of the electrode plate.

The automatic gluing apparatus for a fixed shaft-type rewinding reel in the present invention includes:

- a gluing mechanism, where the gluing mechanism includes a mounting plate, a side of the mounting plate is provided with a glue scraping head configured to apply a glue to the rewinding reel, a glue-scraping drive assembly that is configured to drive the glue scraping head to approach or leave the rewinding reel is disposed between the glue scraping head and the mounting plate, and the glue scraping head includes a glue scraping surface fitting with a shape of an outer surface of the rewinding reel; and
- a glue supply mechanism, disposed on a side of the mounting plate, connected to the glue scraping head, and configured to supply the glue to the glue scraping head.

Further, in a preferable embodiment, the glue scraping head further includes:

- a glue scraping seat, where the glue scraping seat is provided with a glue flow hole for the liquid glue to flow in; and
- a scraper, disposed on a side of the glue scraping seat and detachably connected to the glue scraping seat, where a glue outlet is formed between the scraper and the glue scraping seat, and the glue outlet is located on the glue scraping surface and communicates with the glue flow hole.

In a preferable embodiment, the glue-scraping drive assembly includes:

- a connecting plate disposed on a side of the mounting plate, where a glue-scraping drive member that is configured to drive the connecting plate to approach or leave the rewinding reel is disposed between the connecting plate and the mounting plate;
- an adjustment seat, disposed on a side of the connecting plate away from the mounting plate and rotatably connected to the connecting plate, where a first elastic member is disposed between the adjustment seat and the connecting plate;
- a transition frame disposed on a side of the adjustment seat away from the connecting plate, where a second elastic member is disposed between the transition frame and the adjustment seat; and
- a loading plate disposed in the transition frame, where a third elastic member is disposed between the loading plate and the transition frame, and the loading plate is detachably connected to the glue scraping head.

Further, in a preferable embodiment, a side of the transition frame is provided with a bottom plate, the bottom plate is provided with a roller, the roller is detachably connected to the bottom plate, and when the gluing mechanism applies the glue, the roller rolls on a surface of the rewinding reel.

Further, in a preferable embodiment, a side of the adjustment seat is provided with a drying assembly configured to accelerate drying of the liquid glue.

Furthermore, in a preferable embodiment, the drying assembly includes an air nozzle, the air nozzle is disposed on a side of the adjustment seat, an air inlet end of the air nozzle is provided with a hot air pipe, and the hot air pipe communicates with the air nozzle.

In a preferable embodiment, the glue supply mechanism includes:

- a glue storage tank disposed on a side of the mounting plate, where the glue storage tank is provided with a glue extruding member configured to extrude the liquid glue; and
- a glue supply valve disposed on a side of the mounting plate, where the glue storage tank and the glue scraping head both communicate with the glue supply valve.

In a preferable embodiment, a side of the gluing mechanism is provided with a frame, the frame is provided with a cleaning assembly, and a moving assembly that is configured to drive the gluing mechanism to approach or leave the cleaning assembly is disposed between the frame and the gluing mechanism.

Further, in a preferable embodiment, the cleaning assembly includes:

- a fixed seat disposed on the frame; and
- a cleaning box disposed on a side of the fixed seat, where a side of the cleaning box is provided with a cleaning cloth for wiping the glue scraping head, and a cleaning drive assembly that is configured to drive the cleaning box to approach or leave the glue scraping head is disposed between the cleaning box and the fixed seat.

Furthermore, in a preferable embodiment, one side of the cleaning box is provided with an unwinding roller configured to unwind the cleaning cloth, the other side is provided with a rewinding roller configured to rewind the cleaning cloth, and the rewinding roller is in transmissive connection with a rewinding drive member configured to drive the rewinding roller to rotate.

Compared with the prior art, the present invention has the following advantages and beneficial effects:

In the present invention, according to the automatic gluing apparatus for a fixed shaft-type rewinding reel, the rewinding reel to be glued moves to a side of the gluing mechanism. The glue-scraping drive assembly drives the glue scraping head to approach the rewinding reel, and the glue supply mechanism supplies the glue to the glue scraping head. As the rewinding reel moves, the glue scraping surface of the glue scraping head adheres to the outer surface of the rewinding reel, such that the liquid glue is evenly scraped onto the surface of the rewinding reel. The gluing mechanism thus achieves automatic gluing on the rewinding reel. The cooperation between the gluing mechanism and the glue supply mechanism addresses the low efficiency of the existing manual gluing operation, thereby improving the production efficiency of the electrode plates.

REFERENCE NUMERALS

1. gluing mechanism; 11. mounting plate; 12. connecting plate; 121. glue-scraping drive member; 13. adjustment seat; 131. first elastic member; 14. transition frame; 141. second elastic member; 15. loading plate; 151. third elastic member; 152. loading hole; 16. glue scraping head; 161. glue scraping surface; 162. glue scraping seat; 1621. glue flow hole; 1621. set screw hole; 163. scraper; 164. glue outlet; 165. gasket; 17. bottom plate; 171. roller; 2. drying assembly; 21. air nozzle; 211. positioning plate; 212. positioning waist-shaped hole; 22. bracket; 23. hot air pipe; 3. glue supply mechanism; 31. glue storage tank; 311. glue extruding member; 3111. adjustment valve; 32. glue supply valve; 321. glue supply pipe; 4. frame; 41. moving assembly; 411. linear module; 412. drag chain; 42. adjustment plate; 5. cleaning assembly; 51. fixed seat; 511. guide rail; 52. connecting seat; 521. first seat body; 522. second seat body; 523. rotating shaft; 524. placement slot; 53. cleaning box; 531. cleaning cloth; 532. over roller; 54. cleaning drive assembly; 541. moving cylinder; 542. guide block; 543. connecting rod; 55. fixed lock block; 56. unwinding roller; 57. rewinding roller; 58. rewinding drive member; 581. stepper motor; 582. belt; 583. photoelectric sensor; 6. optical fiber sensor; 7. color mark sensor; 8. rewinding reel; 81. first groove; 82. second groove; and 83. transport vehicle.

DETAILED DESCRIPTION OF THE INVENTION

It should be noted that, in a case of no conflict, the embodiments and technical features in the embodiments of this application can be combined with each other. The detailed descriptions in the specific implementations should be understood as explanations of the objective of this application and should not be seen as undue limitations on this application.

To make the objectives, technical solutions, and advantages of the embodiments of this application clearer, the following provides a further detailed description of the specific technical solutions of this application with reference to the drawings in the embodiments of this application. The following embodiments are used to describe this application, but not to limit the scope of this application.

Embodiment 1

An automatic gluing apparatus for a fixed shaft-type rewinding reel 8 in the present invention can perform automatic gluing on the rewinding reel 8 before the electrode plate rewinding process, thereby improving the rewinding efficiency of the electrode plate.

Figure 1:
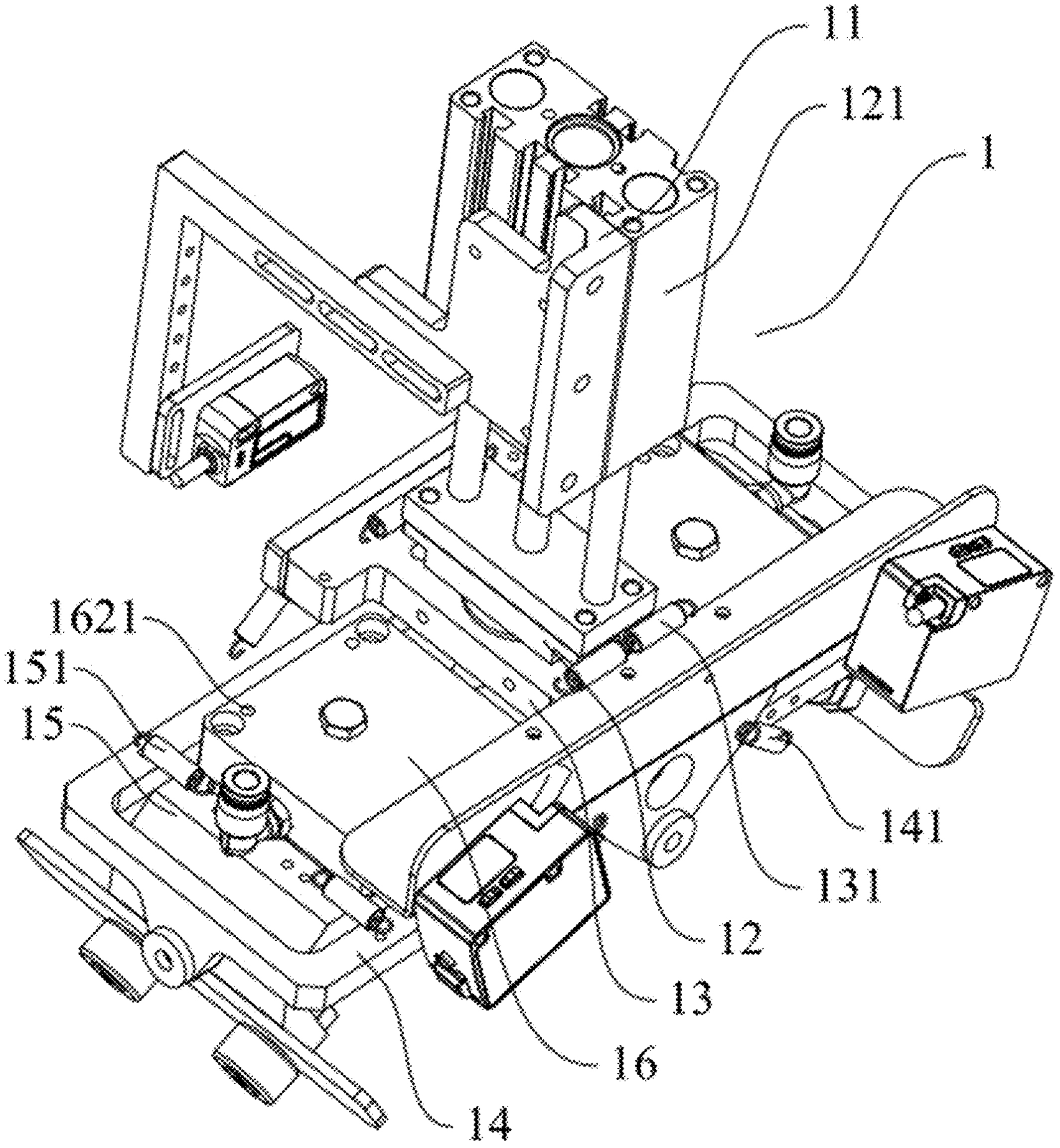
FIG. 1 is a schematic structural diagram of a gluing mechanism according to a specific embodiment of the present invention.

Referring to FIG. 1, the automatic gluing apparatus for a fixed shaft-type rewinding reel 8 in the present invention includes a gluing mechanism 1. The gluing mechanism 1 includes a mounting plate 11, and the mounting plate 11 is specifically a vertically arranged long plate.

In a preferred embodiment, a side of the mounting plate 11 is provided with a connecting plate 12, and the connecting plate 12 is specifically a horizontally arranged long plate. A glue-scraping drive member 121 that is configured to drive the connecting plate 12 up and down is disposed between the connecting plate 12 and the mounting plate 11, and the glue-scraping drive member 121 is preferably but not limited to a glue-scraping cylinder. A piston rod of the glue-scraping cylinder is connected to the connecting plate 12 to drive the connecting plate 12 to approach or leave the rewinding reel 8. A side of the connecting plate 12 away from the mounting plate 11 is provided with an adjustment seat 13. A rotary shaft is arranged between the adjustment seat 13 and the connecting plate 12. One end of the rotary shaft along the axial direction is rotatably connected to the connecting plate 12, and the other end is connected to the adjustment seat 13. The adjustment seat 13 and the connecting plate 12 can rotate relative to each other via the rotary shaft.

A first elastic member 131 is arranged between the adjustment seat 13 and the connecting plate 12. The first elastic member 131 is preferably but not limited to a first spring. Specifically, the first elastic member 131 is arranged parallel to the connecting plate 12. One end of the first elastic member 131 in the stretching direction is connected to the adjustment seat 13, and the other end is connected to the connecting plate 12. In some specific embodiments shown, the adjustment seat 13 and the connecting plate 12 are each provided with a first screw. The first elastic member 131 is connected to the adjustment seat 13 and the connecting plate 12 by hooking onto the first screws. The adjustment seat 13 and the connecting plate 12 are elastically connected via the first elastic member 131, which can improve the degree of freedom of the gluing mechanism 1.

The side of the adjustment seat 13 away from the connecting plate 12 is provided with a transition frame 14. The transition frame 14 is specifically a horizontally arranged frame-shaped plate. A second elastic member 141 is arranged between the transition frame 14 and the adjustment seat 13. The second elastic member 141 is preferably but not limited to a second spring. Specifically, the second elastic member 141 is arranged obliquely relative to the transition frame 14. One end of the second elastic member 141, along the stretching direction, is connected to the transition frame 14, and the other end is connected to the adjustment seat 13. In some specific embodiments shown, the transition frame 14 and the adjustment seat 13 are each provided with a second screw. The second elastic member 141 is connected to the transition frame 14 and the adjustment seat 13 by hooking onto the second screws. The transition frame 14 and the adjustment seat 13 are elastically connected through the second elastic member 141, which can improve the degree of freedom of the gluing mechanism 1.

The transition frame 14 is provided with a loading plate 15 inside, and the loading plate 15 is specifically a horizontally arranged long plate and located at the bottom of the adjustment seat 13. A third elastic member 151 is provided between the loading plate 15 and the long plate. The third elastic member 151 is preferably but not limited to a third spring. Specifically, the third elastic member 151 is arranged parallel to the loading plate 15, and the stretching direction of the third elastic member 151 is perpendicular to the stretching direction of the first elastic member 131. One end of the third elastic member 151, along the stretching direction, is connected to the loading plate 15, and the other end is connected to the transition frame 14. In some specific embodiments shown, the loading plate 15 and the transition frame 14 are each provided with a third screw. The third elastic member 151 is connected to the loading plate 15 and the transition frame 14 by hooking onto the third screws. The loading plate 15 and the transition frame 14 are elastically connected via the third elastic member 151, which can improve the degree of freedom of the gluing mechanism 1.

Figure 2:
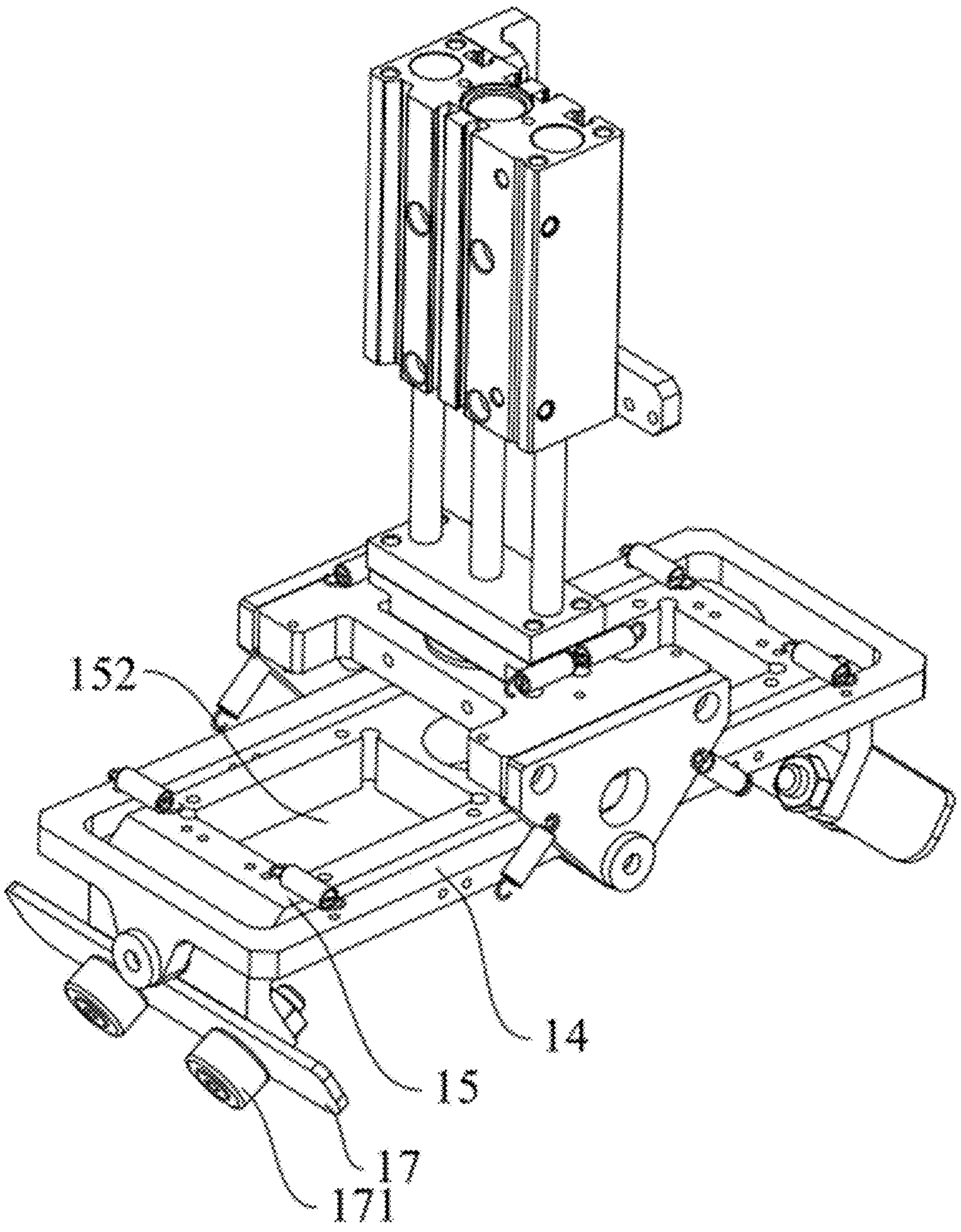
FIG. 2 is a schematic structural diagram of the gluing mechanism with a glue scraping head hidden according to a specific embodiment of the present invention.
Figure 3:
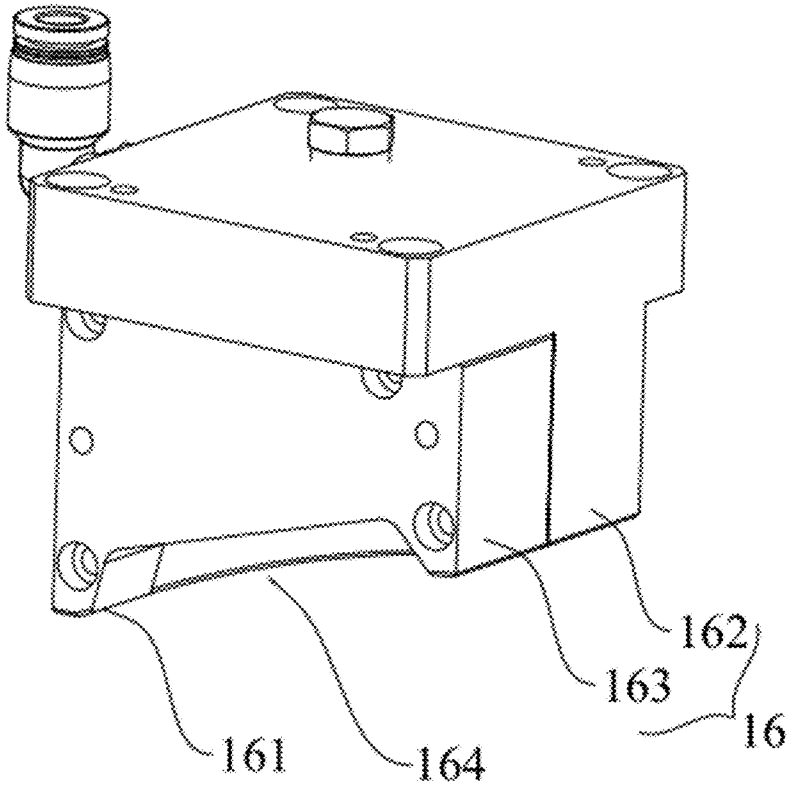
FIG. 3 is a schematic structural diagram of the glue scraping head according to a specific embodiment of the present invention.

Referring to FIGS. 1 and 2, the side of the loading plate 15 close to the adjustment seat 13 is provided with a loading hole 152. Specifically, there are two loading holes 152, and the two loading holes 152 are distributed along the stretching direction of the first elastic member 131. Referring to FIGS. 1 and 3, the loading plate 15 is provided with a glue scraping head 16 that is configured to apply a glue to the surface of the rewinding reel 8 in the loading hole 152. The glue scraping head 16 includes a glue scraping surface 161. Specifically, the glue scraping surface 161 is an arc surface. A glue scraping surface 161 of the glue scraping head 16 fits with the outer surface of the rewinding reel 8.

Figure 4:
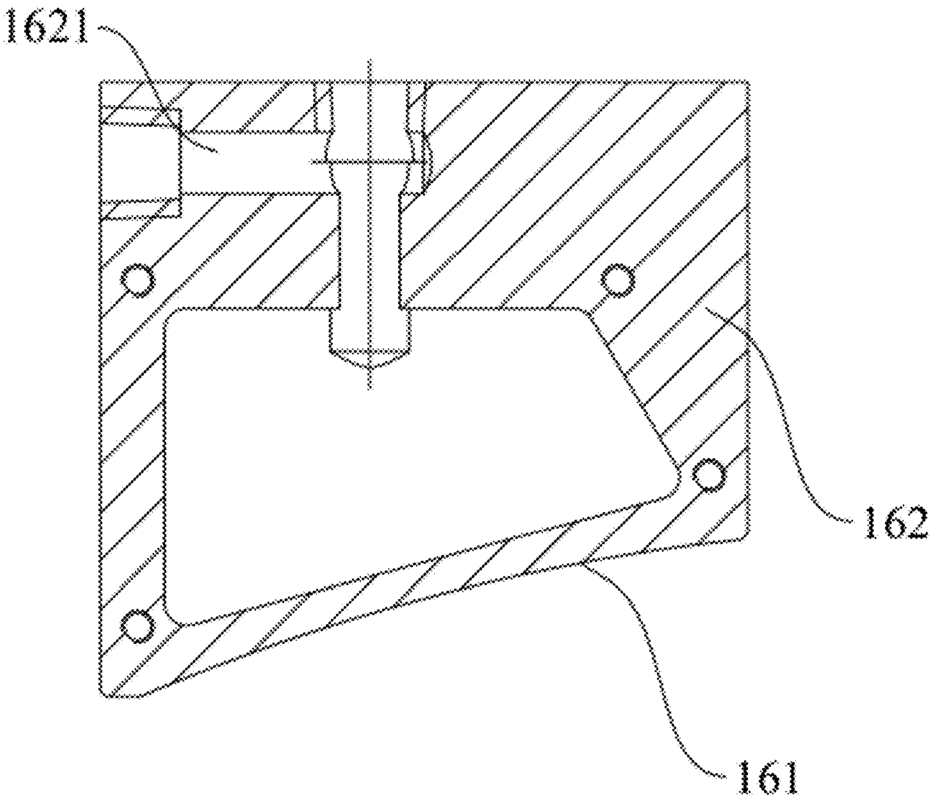
FIG. 4 is a sectional view of a glue scraping seat along a length direction of a glue flow hole according to a specific embodiment of the present invention.

The glue scraping head 16 also includes a glue scraping seat 162, and the glue scraping seat 162 is detachably connected to the loading plate 15. Specifically, the glue scraping seat 162 and the loading plate 15 can be assembled by bolts. The side of the glue scraping seat 162 close to the adjustment seat 13 is provided with a set screw hole 1621. A set screw is arranged inside the set screw hole 1621 of the glue scraping seat 162 for adjusting the distance between the glue scraping seat 162 and the loading plate 15. The glue scraping seat 162 adjusts the distance to the loading plate 15 via the set screw to change the gluing thickness of the glue scraping head 16. Referring to FIG. 4, the side of the glue scraping seat 162 close to the adjustment seat 13 is provided with a glue flow hole 1621 for the glue liquid to flow in.

Figure 5:
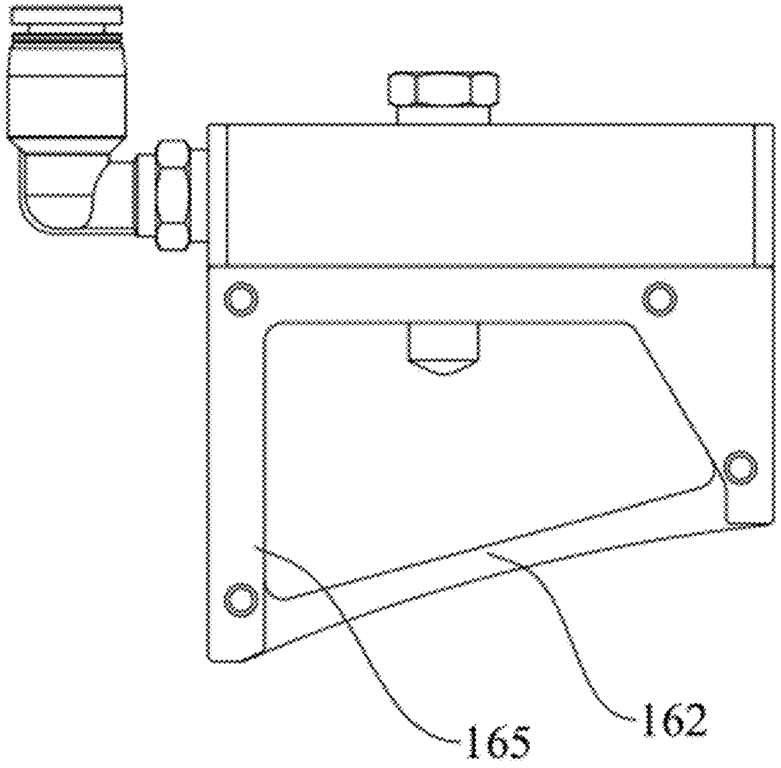
FIG. 5 is a front view of the glue scraping seat and a gasket according to a specific embodiment of the present invention.

Referring to FIG. 3, a side of the glue scraping seat 162 is detachably connected to a scraper. A glue outlet 164 is formed between the scraper and the glue scraping seat 162. The glue outlet 164 communicates with the glue flow hole 1621, such that the glue liquid flows into the glue scraping seat 162 through the glue flow hole 1621 and then flows out of the glue outlet 164 to the surface of the rewinding reel 8. Referring to FIG. 5, further, a gasket 165 is arranged between the scraper and the glue scraping seat 162. Specifically, the gasket 165 is a U-shaped gasket 165. The gasket 165, the scraper, and the glue scraping seat 162 can be assembled by bolts. The size of the glue outlet 164 can be adjusted by replacing the gasket 165 with a different thickness specification between the scraper and the glue scraping seat 162.

Referring to FIG. 2, a side of the transition frame 14 is provided with bottom plates 17. Specifically, the bottom plates 17 are arranged on two opposite sides of the transition frame 14. The bottom plate 17 is arranged on a side of the glue scraping head 16, and the side of the bottom plate 17 away from the glue scraping head 16 is provided with a roller 171. The roller 171 is detachably connected to the bottom plate 17. When the glue scraping head 16 applies the liquid glue to the surface of the rewinding reel 8, the roller 171 rolls on the surface of the rewinding reel 8. The roller 171 serves a supporting function, allowing the glue scraping head 16 to move smoothly on the surface of the rewinding reel 8.

Figure 6:
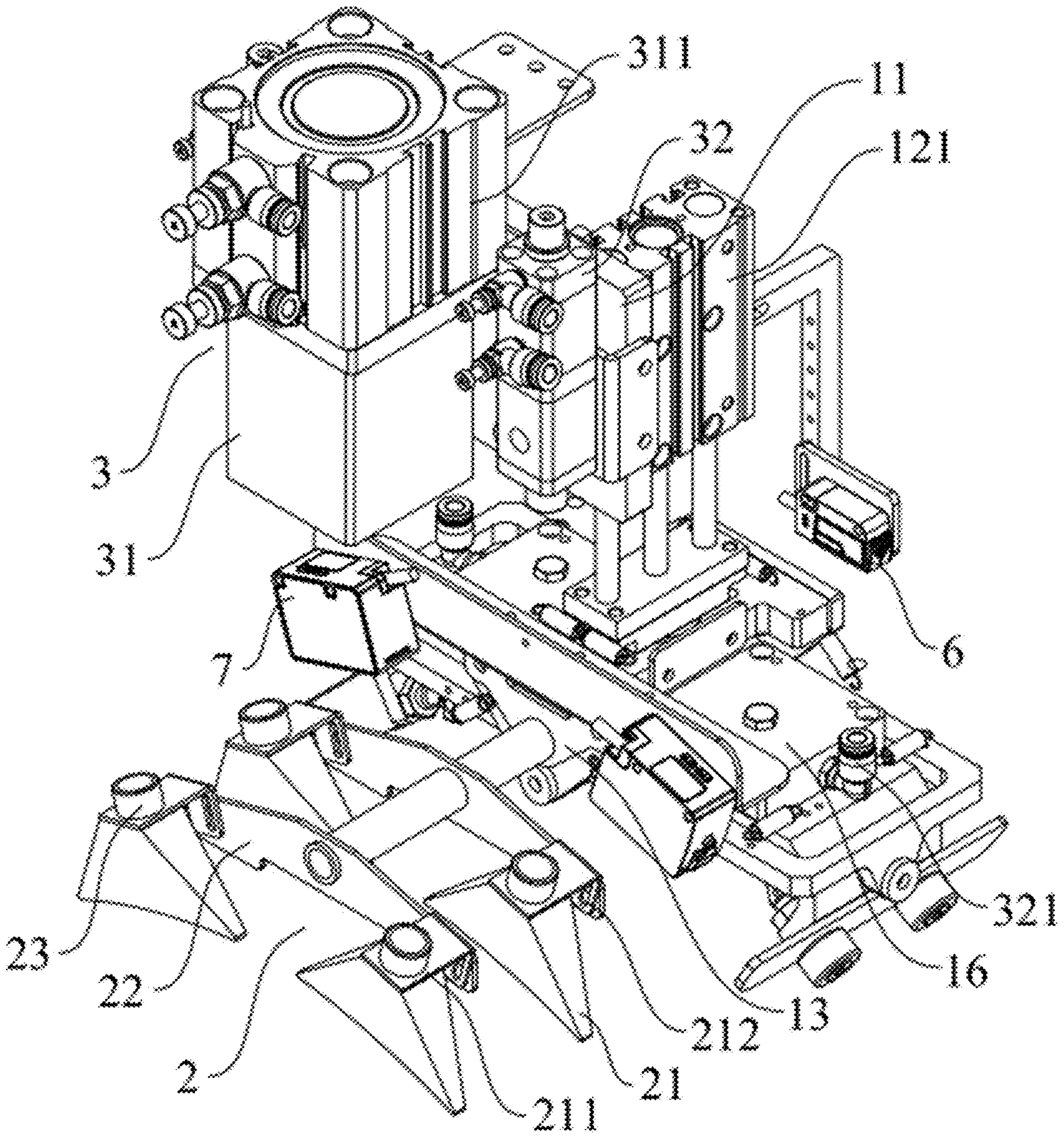
FIG. 6 is a schematic structural diagram of the gluing mechanism, a glue supply mechanism, and a drying assembly according to a specific embodiment of the present invention.

Referring to FIG. 6, the side of the mounting plate 11 away from the gluing mechanism 1 is provided with a glue supply mechanism 3. The glue supply mechanism 3 includes a glue storage tank 31 for storing the liquid glue. The glue storage tank 31 is mounted on the corresponding side of the mounting plate 11. A side of the glue storage tank 31 is provided with a glue extruding member 311, and the glue extruding member 311 is preferably but not limited to a cylinder. The glue extruding member 311 extrudes the liquid glue in the glue storage tank 31 to achieve glue supply. Additionally, the glue extruding member 311 communicates with an adjustment valve 3111 (refer to FIG. 7). Specifically, the adjustment valve 3111 is a cylinder pressure regulating valve. The glue extruding member 311 can adjust the amount of glue dispensed from the glue storage tank 31 per unit time via the adjustment valve 3111, thereby adjusting the gluing thickness.

A side of the glue storage tank 31 is provided with a glue supply valve 32. The glue supply valve 32 communicates with the glue storage tank 31 and is mounted on the mounting plate 11. A glue supply pipe 321 is disposed between the glue supply valve 32 and the glue scraping seat 162. The glue scraping seat 162 communicates with the glue supply pipe 321 at the glue flow hole 1621. When the gluing mechanism 1 applies the glue, the glue extruding member 311 extrudes the liquid glue in the glue storage tank 31. After the glue supply valve 32 is opened, the glue liquid flows sequentially through the glue supply valve 32 and the glue supply pipe 321, and then flows out of the glue outlet 164 through the glue flow hole 1621 to the surface of the rewinding reel 8.

In some specific embodiments shown, a side of the glue storage tank 31 is provided with a primary glue supply module. The primary glue supply module includes a glue supply pump, a pressure transmitter, a pressure relief valve, and a check valve arranged sequentially along the flow direction of the liquid glue. The glue supply pump is preferably but not limited to a platen screw pump. The platen screw pump fills the glue storage tank 31 with a glue. The pressure transmitter and the pressure relief valve can adjust the pressure during the delivery process of the liquid glue, so as to reduce an overpressure situation caused by blockage or improper operation. The check valve can reduce the situation where the liquid glue flows back to the glue supply pump during the delivery process after the glue extruding member 311 quickly extrudes the glue, ensuring the smooth delivery of the liquid glue and improving the uniformity and stability of the glue supply of the glue supply mechanism 3.

Figure 7:
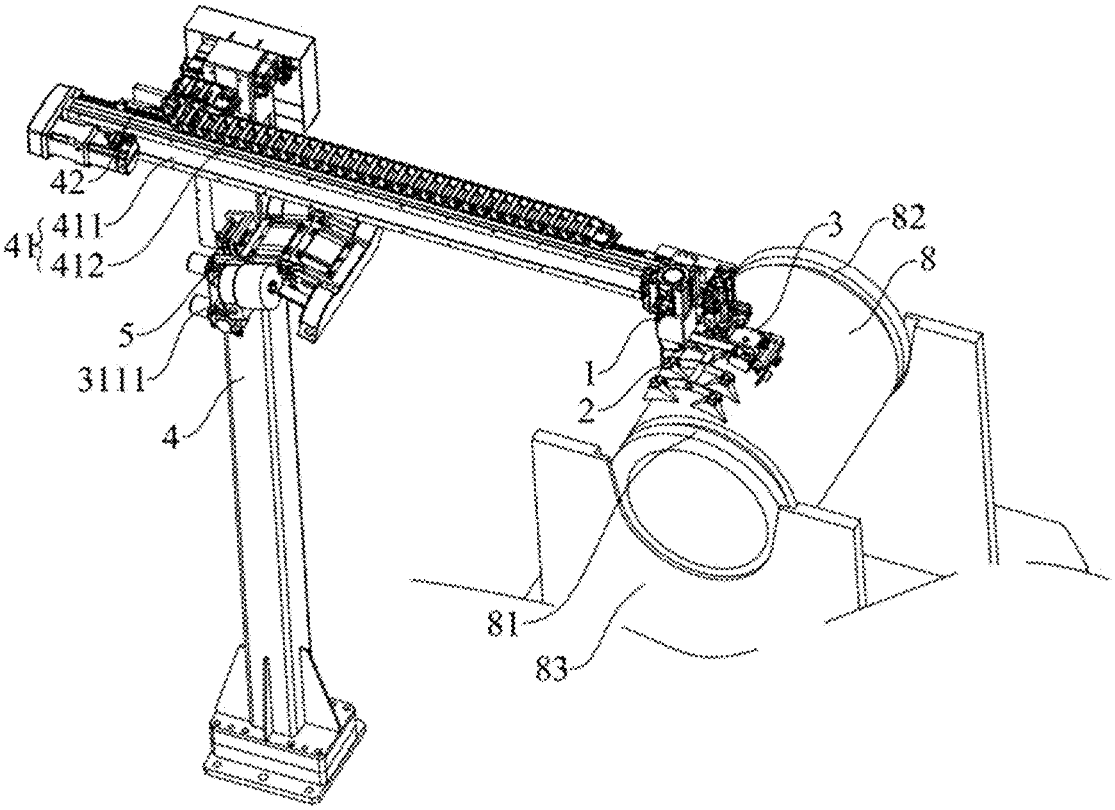
FIG. 7 is a schematic structural diagram of an automatic gluing apparatus for a fixed shaft-type rewinding reel according to a specific embodiment of the present invention.

When the gluing mechanism 1 applies the glue, the rewinding reel 8 is glued at the bottom of the gluing mechanism 1. Referring to FIG. 7, the rewinding reel 8 can be transported and moved by a transport vehicle 83. Referring to FIGS. 1 and 2, the glue-scraping drive member 121 drives the connecting plate 12 to move towards the rewinding reel 8. The connecting plate 12 drives the adjustment seat 13, the transition frame 14, the loading plate 15, and the glue scraping head 16 to move towards the rewinding reel 8, such that the glue scraping surface 161 of the glue scraping head 16 fully fits with the surface of the rewinding reel 8, and the roller 171 fits with the surface of the rewinding reel 8.

The arrangement of the first elastic member 131, the second elastic member 141, and the third elastic member 151 can effectively offset the impact caused by the angle or center distance deviation between the rewinding reel 8 and the glue scraping head 16 when the rewinding reel 8 comes into contact with the glue scraping head 16, providing a certain degree of protection for the glue scraping head 16. When the rewinding reel 8 fits with the glue scraping head 16, the offset between the center of the rewinding reel 8 and the center of the glue scraping head 16 causes the adjustment seat 13 to rotate laterally. The adjustment seat 13 is rotationally connected to the connecting plate 12, which can effectively eliminate the lateral rotation, allowing for multiple degrees of freedom of the gluing mechanism 1, so as to adapt to a gluing operation at a different angle.

Referring to FIGS. 3 to 5, the transport vehicle 83 drives the rewinding reel 8 to move, the liquid glue flows out of the glue outlet 164, and the scraper 163 cooperates with the glue scraping seat 162 to scrape and apply the liquid glue, achieving automatic gluing on the rewinding reel 8. The glue supply mechanism 3 supplies the liquid glue to the gluing mechanism 1, and the gluing mechanism 1 applies the glue to the rewinding reel 8, which can simplify the complex operation and improve the low efficiency caused by manual gluing, thereby increasing the production efficiency of the electrode plate. After the glue scraping head 16 is replaced, the shape of the glue application can be changed, making it suitable for processes such as battery chip packaging and wafer dispensing.

Embodiment 2

To enable the liquid glue to dry quickly after scraping and further improve the production efficiency of the electrode plate, this embodiment differs from Embodiment 1 in that, referring to FIG. 6, a side of the gluing mechanism 1 is provided with a drying assembly 2. The drying assembly 2 includes a bracket 22, and the bracket 22 is arranged on a side of the adjustment seat 13 and located on a side of the glue scraping head 16 close to the tail end of the scraping direction. The side of the bracket 22 away from the adjustment seat 13 is provided with an air nozzle 21. Specifically, the air nozzle 21 includes an air outlet end and an air inlet end. The air outlet end of the air nozzle 21 fits with the surface of the rewinding reel 8, such that the air nozzle 21 can fully dry the liquid glue. The air inlet end of the air nozzle 21 is provided with a hot air pipe 23, and the hot air pipe 23 communicates with the air nozzle 21. An end of the hot air pipe 23 away from the air nozzle 21 is connected to an air compressing heater.

Further, a positioning plate 211 is arranged between the air nozzle 21 and the bracket 22. The positioning plate 211 is connected to the air nozzle 21, and the side of the positioning plate 211 close to the bracket 22 is provided with a positioning waist-shaped hole 212. The positioning plate 211 can be assembled with the bracket 22 by bolts at the positioning waist-shaped hole 212. The connection position of the air nozzle 21 with the bracket 22 is adjusted via the positioning plate 211, so as to adapt to the rewinding reel 8 with a different specification.

When the drying assembly 2 operates, the air compressing heater generates hot air, and the hot air flows through the hot air pipe 23 to the air nozzle 21 and is blown onto the surface of the rewinding reel 8 by the air nozzle 21. The hot air accelerates the drying of the liquid glue applied to the rewinding reel 8, thereby improving the gluing efficiency of the rewinding reel 8. In this case, the production efficiency of the electrode plate is further improved.

Embodiment 3

To promptly clean the residual liquid glue on the glue scraping head 16 and improve the convenience of using the glue scraping head 16, this embodiment differs from the above embodiments in that, referring to FIG. 7, a frame 4 is also included. The gluing mechanism 1 is arranged on a side of the frame 4, and a moving assembly 41 is arranged between the frame 4 and the mounting plate 11. The moving assembly 41 drives the mounting plate 11 to slide along the frame 4, thereby driving the glue scraping head 16 to move. Further, the moving assembly 41 includes a linear module 411 mounted on the frame 4. A side of the linear module 411 is provided with a drag chain 412. The mounting plate 11 is driven by the linear module 411 and the drag chain 412, which can be known and realized by those skilled in the art, and will not be described redundantly in this embodiment. An adjustment plate 42 is arranged between the frame 4 and the linear module 411. The adjustment plate 42 is detachably connected to the frame 4. The moving assembly 41 and the gluing mechanism 1 can be integrally moved by adjusting the mounting position of the adjustment plate 42.

Figure 8:
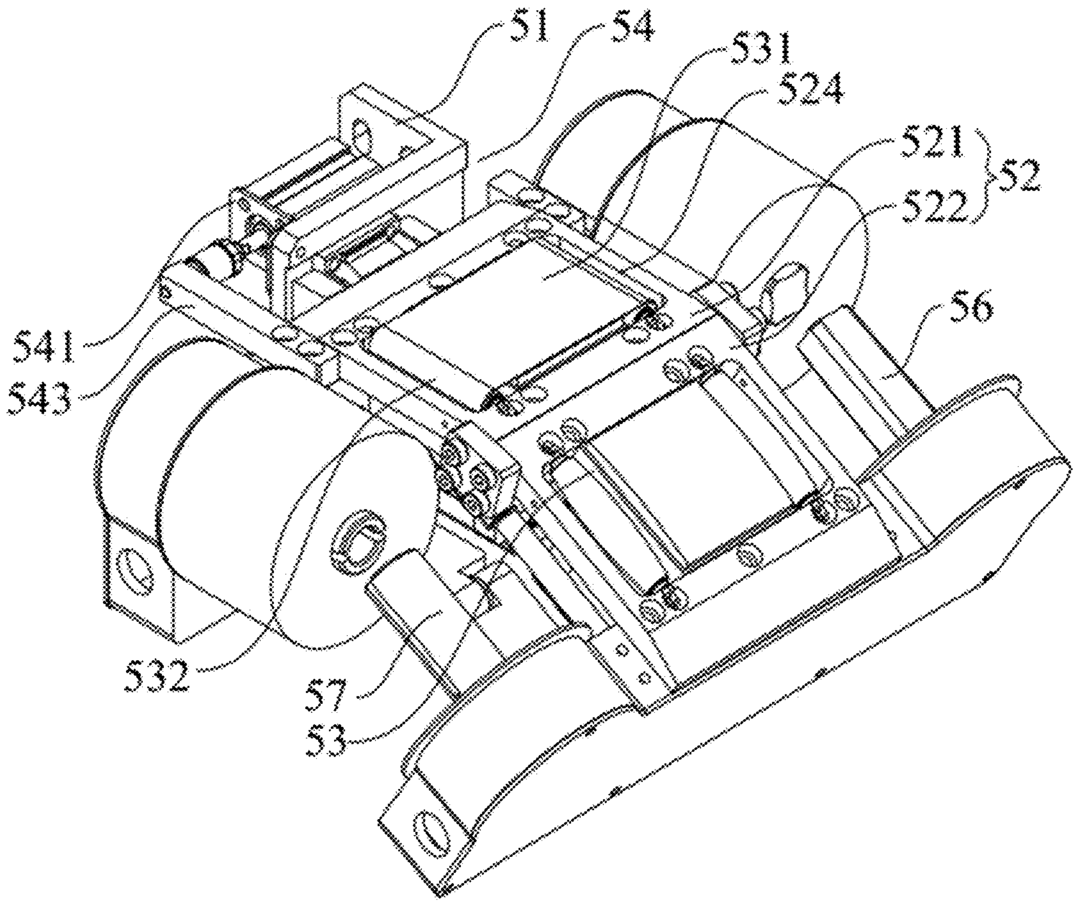
FIG. 8 is a schematic structural diagram of a cleaning assembly according to a specific embodiment of the present invention.
Figure 9:
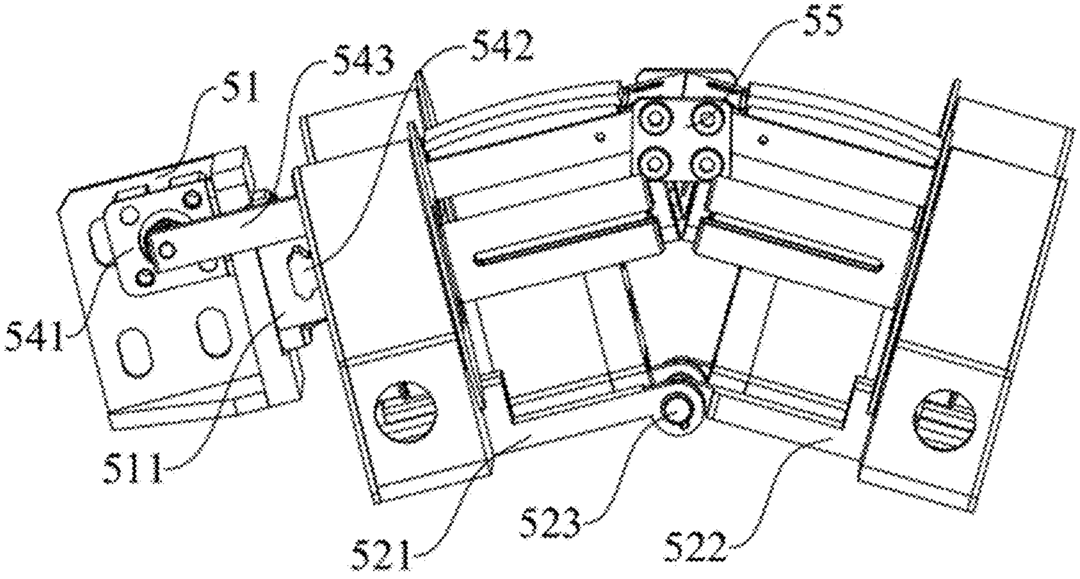
FIG. 9 is a front view of the cleaning assembly according to a specific embodiment of the present invention.

A cleaning assembly 5 is arranged on the frame 4. The moving assembly 41 can drive the gluing mechanism 1 to reciprocate between the rewinding reel 8 and the cleaning assembly 5. Referring to FIG. 8, in a preferred embodiment, the cleaning assembly 5 includes a fixed seat 51. The fixed seat 51 is fixedly connected to the frame 4. A side of the fixed seat 51 is provided with a connecting seat 52. In some specific embodiments shown, the connecting seat 52 includes a first seat body 521 and a second seat body 522. The first seat body 521 and the second seat body 522 are respectively arranged corresponding to the two glue scraping heads 16. Referring to FIG. 9, a rotating shaft 523 is arranged between the first seat body 521 and the second seat body 522. The rotating shaft 523 is specifically arranged horizontally, with the axial direction being perpendicular to the distribution direction of the first seat body 521 and the second seat body 522. The first seat body 521 and the second seat body 522 both rotate around the rotating shaft 523. A fixed lock block 55 is arranged between the first seat body 521 and the second seat body 522. The fixed lock block 55 connects the first seat body 521 and the second seat body 522 to lock the first seat body 521 and the second seat body 522 after rotation. The arrangement of the first seat body 521 and the second seat body 522 can improve the structural flexibility of the connecting seat 52.

Referring to FIG. 8, placement slots 524 are arranged on both the first seat body 521 and the second seat body 522. The connecting seat 52 is provided with a cleaning box 53 within the placement slot 524. A side of the cleaning box 53 is provided with a cleaning cloth 531. When the moving assembly 41 drives the gluing mechanism 1 to move above the cleaning cloth 531, the cleaning cloth 531 can be used to wipe the residual liquid glue on the glue scraping head 16. Two opposite sides of the cleaning box 53 are provided with over rollers 532. The over rollers 532 are arranged in the placement slots 524 and are rotatably connected to the connecting seat 52.

Further, a side of the connecting seat 52 is provided with an unwinding roller 56. The unwinding roller 56 unwinds the clean cleaning cloth 531. A side of the connecting seat 52 away from the unwinding roller 56 is provided with a rewinding roller 57. The rewinding roller 57 is rotatably connected to the connecting seat 52 and rewinds the used cleaning cloth 531.

Figure 10:
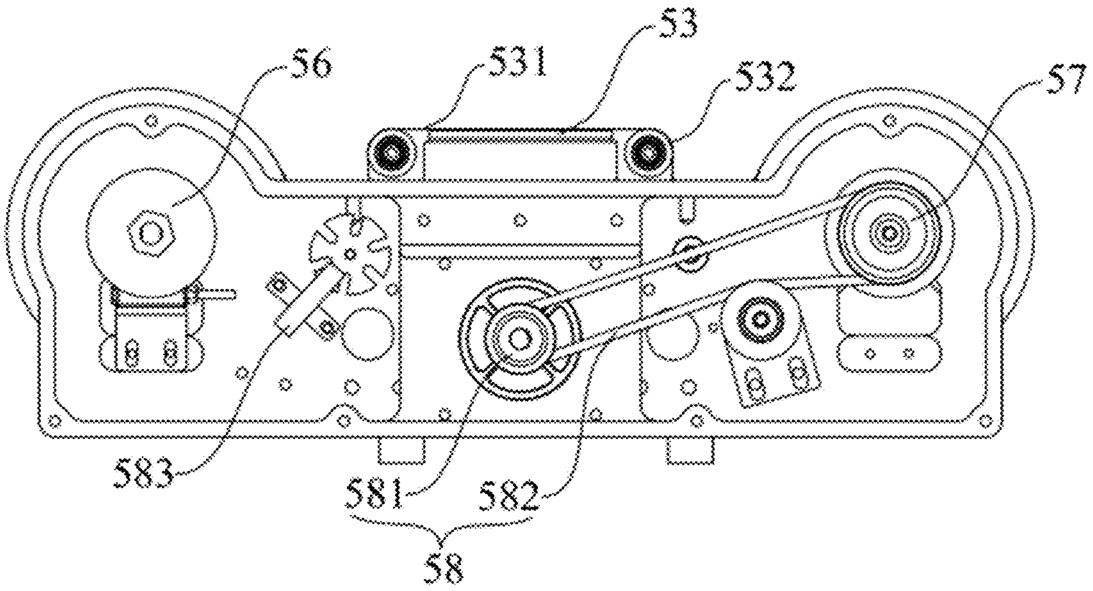
FIG. 10 is a side view of an internal structure of the cleaning assembly according to a specific embodiment of the present invention.

Referring to FIG. 10, a side of the rewinding roller 57 is provided with a rewinding drive member 58. In some specific embodiments shown, the rewinding drive member 58 includes a stepper motor 581. A belt 582 is arranged between the stepper motor 581 and the rewinding roller 57. The rewinding roller 57 is connected to the output end of the stepper motor 581 through the belt 582. When the stepper motor 581 drives the rewinding roller 57 to rotate via the belt 582, the rewinding roller 57 rewinds the cleaning cloth 531 that has been used for wiping, achieving automatic replacement of the cleaning cloth 531. Additionally, a side of the rewinding roller 57 is provided with a photoelectric sensor 583. The photoelectric sensor 583 measures the length of the cleaning cloth 531 rewound each time.

Referring to FIGS. 8 and 9, a cleaning drive assembly 54 is arranged between the fixed seat 51 and the connecting seat 52. The cleaning drive assembly 54 includes a connecting rod 543. The connecting rod 543 is mounted on the connecting seat 52. A moving cylinder 541 is arranged between the connecting rod 543 and the fixed seat 51. The cylinder tube of the moving cylinder 541 is mounted on the fixed seat 51, and the piston rod of the moving cylinder 541 is connected to the connecting rod 543. The moving cylinder 541 drives the connecting seat 52 to reciprocate relative to the fixed seat 51 through the extension and retraction of the piston rod. Further, a guide rail 511 is arranged on the side of the fixed seat 51 close to the connecting seat 52. A guide block 542 is slidably connected within the guide rail 511. The guide block 542 is connected to the connecting seat 52. The guide rail 511 and the guide block 542 cooperate to guide the reciprocating motion of the connecting seat 52.

Figure 11:
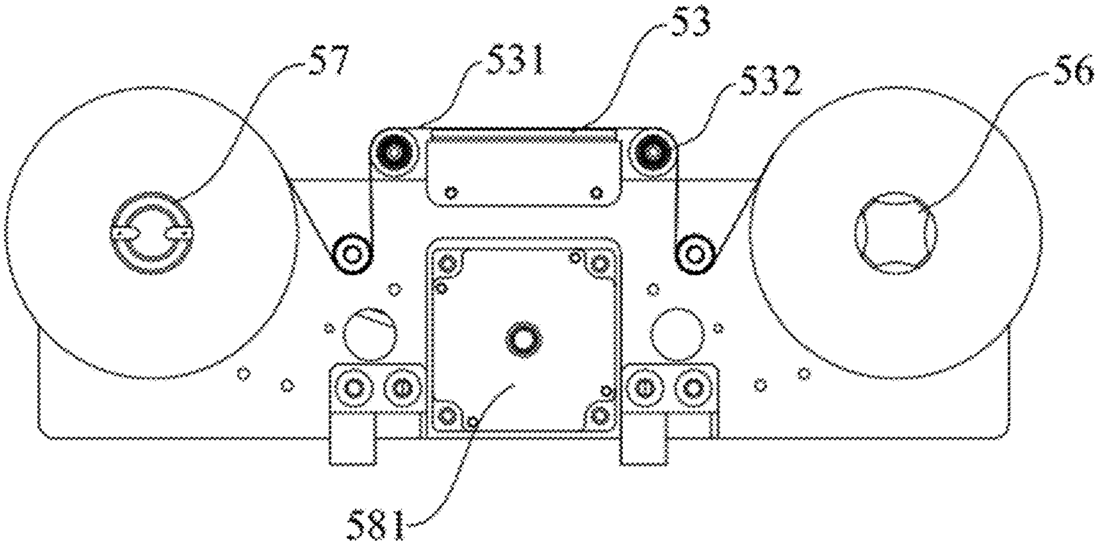
FIG. 11 is a side view of FIG. 10 from another angle.

Referring to FIG. 7, after the gluing mechanism 1 completes the gluing, the moving assembly 41 drives the gluing mechanism 1 to move above the cleaning assembly 5. The glue-scraping drive member 121 drives the glue scraping head 16 to descend to the cleaning box 53. Referring to FIGS. 10 and 11, the moving cylinder 541 drives the connecting seat 52 to reciprocate via the connecting rod 543. The cleaning cloth 531 is used to wipe the residual liquid glue at the glue outlet 164 on the glue scraping head 16, so as to clean the glue scraping head 16, reducing the blockage at the glue outlet 164 due to the dried liquid glue on the glue scraping head 16. When the cleaning cloth 531 needs to be replaced, the stepper motor 581 drives the rewinding roller 57 to rewind the used cleaning cloth 531. As the rewinding roller 57 rewinds, the unwinding roller 56 unwinds the clean cleaning cloth 531 to a side of the cleaning box 53. At this time, the cleaning cloth 531 is rollingly connected with the over roller 532 to improve the smooth movement of the cleaning cloth 531.

Embodiment 4

To further improve the convenience of the gluing operation of the gluing mechanism 1, this embodiment differs from the above embodiments in that, referring to FIGS. 6 and 7, a side of the mounting plate 11 is provided with an optical fiber sensor 6. Additionally, in some specific embodiments shown, an automatic guided vehicle (AGV) may be used as the transport vehicle 83 to achieve automatic transportation of the rewinding reel 8. When the transport vehicle 83 transports the rewinding reel 8 to a side of the frame 4, the moving assembly 41 drives the gluing mechanism 1 to move above the rewinding reel 8. The surface of the rewinding reel 8 is provided with a first groove 81 and a second groove 82. Both the first groove 81 and the second groove 82 are annular grooves distributed along the axial direction of the rewinding reel 8.

The transport vehicle 83 drives the rewinding reel 8 to move so that the optical fiber sensor 6 detects the first groove 81. The glue-scraping drive member 121 drives the glue scraping head 16 to descend to the surface of the rewinding reel 8. The glue scraping surface 161 of the glue scraping head 16 fits with the surface of the rewinding reel 8. The glue supply valve 32 opens, and the glue extruding member 311 extrudes the liquid glue from the glue storage tank 31 into the glue scraping head 16. The rewinding reel 8 continues to move, and the glue scraping head 16 scrapes and applies the liquid glue on the surface of the rewinding reel 8. When the optical fiber sensor 6 detects the second groove 82, the glue-scraping drive member 121 drives the glue scraping head 16 to rise and leave the rewinding reel 8. The glue supply valve 32 closes, and the glue supply mechanism 3 stops supplying glue to the glue scraping head 16. The moving assembly 41 drives the gluing mechanism 1 to move above the cleaning assembly 5. The glue-scraping drive member 121 drives the glue scraping head 16 to descend and fit with the cleaning cloth 531. The cleaning assembly 5 cleans the residual liquid glue on the glue scraping head 16, and the rewinding drive member 58 rewinds the used cleaning cloth 531 onto the rewinding roller 57.

A side of the adjustment seat 13 is provided with a color mark sensor 7. Specifically, there are two color mark sensors 7, and the two color mark sensors 7 respectively correspond the two glue scraping heads 16. During the glue scraping process of the glue scraping head 16, the color mark sensors 7 detect whether the glue strip scraped by the glue scraping head 16 is complete to determine if there is any discontinuity.

In the embodiments of this application, it should be noted that terms such as “upper”, “lower”, “left”, “right”, “front”, and “rear”, indicate orientation or positional relationships based on the orientation or positional relationships shown in the drawings, or the usual placement orientation or positional relationships when the product in the present invention is used, rather than indicate or imply that the referred structures or elements must have specific orientations, be constructed, and operated in specific orientations. Therefore, they should not be construed as limiting the present invention, nor should they be construed as indicating or implying relative importance. Additionally, the terms "first", "second", and the like, are only used for descriptive purposes and distinction, and should not be understood as indicating or implying relative importance.

In the embodiments of this application, words such as "exemplary" and "for example" are used to denote instances, illustrations, or descriptions. Any described embodiments or design solutions involving "exemplary" or "for example" in this application should not be construed as being more preferable or advantageous than other embodiments or design solutions. Specifically, the use of the words "exemplary" or "for example" is intended to present related concepts in a specific manner.

The serial numbers of the above embodiments of this application are merely for descriptive purposes and do not represent the merits of the embodiments. The above shows merely preferred embodiments of this application and is not intended to limit the scope of the patent of this application. Any equivalent structural or process changes made using the content of this specification and the accompanying drawings of this application, or directly or indirectly applied in other related technical fields, are also included within the scope of patent protection of this application.

What is claimed is:

1. An automatic gluing apparatus for a fixed shaft rewinding reel, comprising:

a gluing mechanism, wherein the gluing mechanism comprises a mounting plate, a side of the mounting plate is provided with a glue scraping head configured to apply a glue to the rewinding reel, a glue-scraping drive assembly that is configured to drive the glue scraping head to approach or leave the rewinding reel is disposed between the glue scraping head and the mounting plate, and the glue scraping head comprises a glue scraping surface fitting with a shape of an outer surface of the rewinding reel; and a glue supply mechanism, disposed on a side of the mounting plate, connected to the glue scraping head, and configured to supply the glue to the glue scraping head;

the glue-scraping drive assembly comprises:

a connecting plate disposed on a side of the mounting plate, wherein a glue-scraping drive member that is configured to drive the connecting plate to approach or leave the rewinding reel is disposed between the connecting plate and the mounting plate;

an adjustment seat, disposed on a side of the connecting plate away from the mounting plate and rotatably connected to the connecting plate, wherein a first elastic member is disposed between the adjustment seat and the connecting plate;

a transition frame disposed on a side the adjustment seat away from the connecting plate, wherein a second elastic member is disposed between the transition frame and the adjustment seat; and a loading plate disposed in the transition frame, wherein a third elastic member is disposed between the loading plate and the transition frame, and the loading plate is detachably connected to the glue scraping head.

2. The automatic gluing apparatus for the fixed shaft rewinding reel according to claim 1, wherein the glue scraping head further comprises:

a glue scraping seat, wherein the glue scraping seat is provided with a glue flow hole for the liquid glue to flow in; and a scraper, disposed on a side of the glue scraping seat and detachably connected to the glue scraping seat, wherein a glue outlet is formed between the scraper and the glue scraping seat, and the glue outlet is located on the glue scraping surface and communicates with the glue flow hole.

3. The automatic gluing apparatus for the fixed shaft rewinding reel according to claim 1, wherein a side of the transition frame is provided with a bottom plate, the bottom plate is provided with a roller, the roller is detachably connected to the bottom plate, and when the gluing mechanism applies the glue, the roller rolls on a surface of the rewinding reel.

4. The automatic gluing apparatus for the fixed shaft rewinding reel according to claim 1, wherein a side of the adjustment seat is provided with a drying assembly configured to accelerate drying of the liquid glue.

5. The automatic gluing apparatus for the fixed shaft rewinding reel according to claim 4, wherein the drying assembly comprises an air nozzle, the air nozzle is disposed on a side of the adjustment seat, an air inlet end of the air nozzle is provided with a hot air pipe, and the hot air pipe communicates with the air nozzle.

6. The automatic gluing apparatus for the fixed shaft rewinding reel according to claim 1, wherein the glue supply mechanism comprises:

a glue storage tank disposed on a side of the mounting plate, wherein the glue storage tank is provided with a glue extruding member configured to extrude the liquid glue; and a glue supply valve disposed on a side of the mounting plate, wherein the glue storage tank and the glue scraping head both communicate with the glue supply valve.

7. The automatic gluing apparatus for the fixed shaft rewinding reel according to claim 1, wherein a side of the gluing mechanism is provided with a frame, the frame is provided with a cleaning assembly, and a moving assembly that is configured to drive the gluing mechanism to approach or leave the cleaning assembly is disposed between the frame and the gluing mechanism.

8. The automatic gluing apparatus for the fixed shaft rewinding reel according to claim 7, wherein the cleaning assembly comprises:

a fixed seat disposed on the frame; and a cleaning box disposed on a side of the fixed seat, wherein a side of the cleaning box is provided with a cleaning cloth for wiping the glue scraping head, and a cleaning drive assembly that is configured to drive the cleaning box to approach or leave the glue scraping head is disposed between the cleaning box and the fixed seat.

9. The automatic gluing apparatus for the fixed shaft rewinding reel according to claim 8, wherein one side of the cleaning box is provided with an unwinding roller configured to unwind the cleaning cloth, the other side is provided with a rewinding roller configured to rewind the cleaning cloth, and the rewinding roller is in transmissive connection with a rewinding drive member configured to drive the rewinding roller to rotate.

* * * * *